United States Patent
Mulroy et al.

Patent Number: 6,113,321
Date of Patent: *Sep. 5, 2000

[54] ROLL-FORGED DRILL BIT

[75] Inventors: Michael Mulroy, Durham, United Kingdom; Rudolf Jungwirth, Hutthurm; Johann Riedl, Waldkirchen, both of Germany

[73] Assignee: Black & Decker Inc., Newark, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/686,284

[22] Filed: Jul. 25, 1996

[30] Foreign Application Priority Data

Jul. 29, 1995 [GB] United Kingdom .................. 9515593

[51] Int. Cl.$^7$ ...................................................... B23B 51/02
[52] U.S. Cl. ........................... 408/211; 408/225; 408/230
[58] Field of Search ................................. 408/211, 223, 408/224, 225, 230

[56] References Cited

U.S. PATENT DOCUMENTS

| | | |
|---|---|---|
| 1,017,352 | 2/1912 | Wagner . |
| 2,332,295 | 10/1943 | Bouchal ................................. 408/211 |
| 2,600,286 | 6/1952 | Weiland ................................. 408/211 |
| 2,673,714 | 3/1954 | Hargrave . |
| 3,199,381 | 8/1965 | Mackey, Sr. . |
| 3,592,555 | 7/1971 | Mackey, Sr. . |
| 3,893,353 | 7/1975 | Lahmeyer . |
| 4,503,920 | 3/1985 | Clement . |
| 4,529,341 | 7/1985 | Greene . |
| 4,556,347 | 12/1985 | Barish . |
| 4,729,441 | 3/1988 | Peetz et al. . |
| 4,878,788 | 11/1989 | Wakihira et al. . |
| 4,924,953 | 5/1990 | Moser . |
| 4,968,193 | 11/1990 | Chaconas et al. ....................... 408/211 |
| 4,984,944 | 1/1991 | Pennington, Jr. et al. . |
| 5,011,342 | 4/1991 | Hsu . |
| 5,056,967 | 10/1991 | Hageman . |
| 5,181,811 | 1/1993 | Hosoi . |
| 5,423,640 | 6/1995 | Lindblom et al. . |
| 5,442,979 | 8/1995 | Hsu . |
| 5,570,978 | 11/1996 | Rees et al. . |

FOREIGN PATENT DOCUMENTS

| | | |
|---|---|---|
| 0088037 | 9/1983 | European Pat. Off. . |
| 0137898 | 4/1985 | European Pat. Off. . |
| 1111617 | 3/1956 | France . |
| 2583667 | 12/1986 | France ................................. 408/230 |
| 1918587 | 10/1970 | Germany . |
| 2422452 | of 1974 | Germany . |
| 3123048 | 6/1983 | Germany . |
| 3316193 | 11/1984 | Germany ................................. 408/225 |
| 3538191 | of 1987 | Germany . |
| 4117486 | 12/1992 | Germany ................................. 428/230 |
| 0237709 | 9/1990 | Japan . |
| 3117507 | 5/1991 | Japan . |
| 244311 | 9/1992 | Japan ................................. 408/230 |
| 1238905 | 6/1986 | U.S.S.R. ................................. 408/230 |
| 519475 | 3/1940 | United Kingdom . |
| 948107 | 1/1964 | United Kingdom . |
| 1378342 | of 1972 | United Kingdom . |
| 8303526 | 6/1983 | United Kingdom . |
| 2201910 | of 1987 | United Kingdom . |

*Primary Examiner*—Daniel W. Howell
*Attorney, Agent, or Firm*—Charles E. Yocum

[57] ABSTRACT

A roll-forged drill bit 1 comprising a shank 3 for insertion in a chuck of a drill, the shank 3 including an helically twisted web 7 defining a cutting tip 9, the cutting tip 9 including a central chisel edge 11 and a cutting edge 15 defining the maximum diameter of the cutting tip 9, wherein the cutting tip 9 is formed after the shank 3 has been roll-forged and includes a pair of faces 13 defining the chisel edge 11 and a pair of upturned flats 17 defining the cutting edge 15. A roll-forged drill bit 1 according to the present invention provides a significant improvement in cutting speed over known prior art roll-forged drill bits.

4 Claims, 4 Drawing Sheets

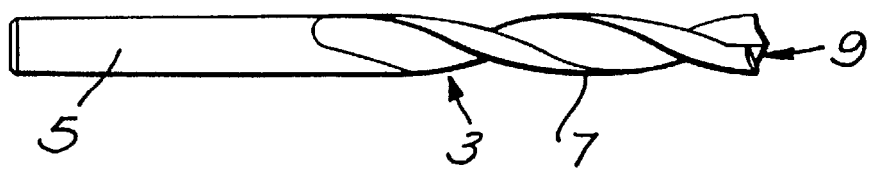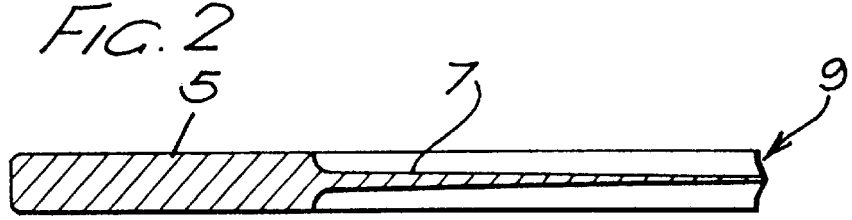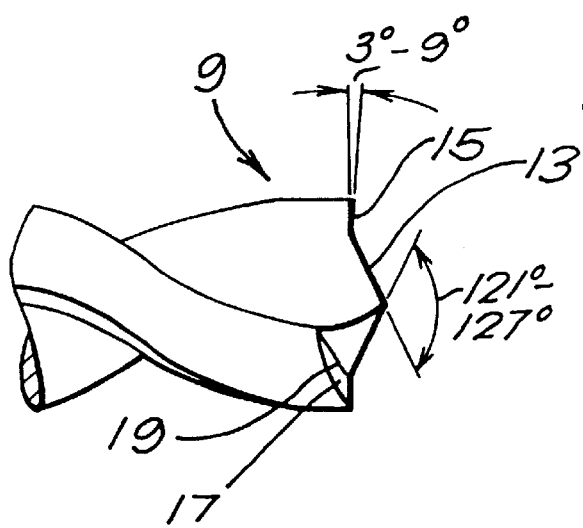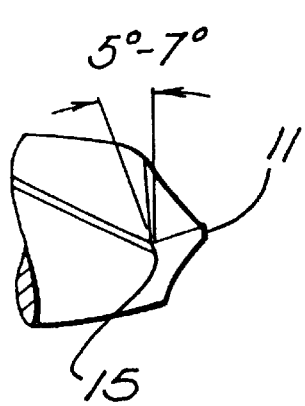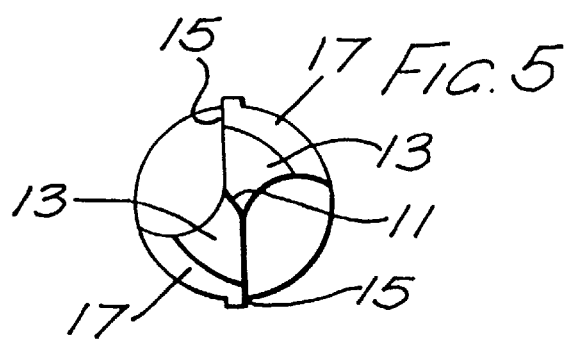

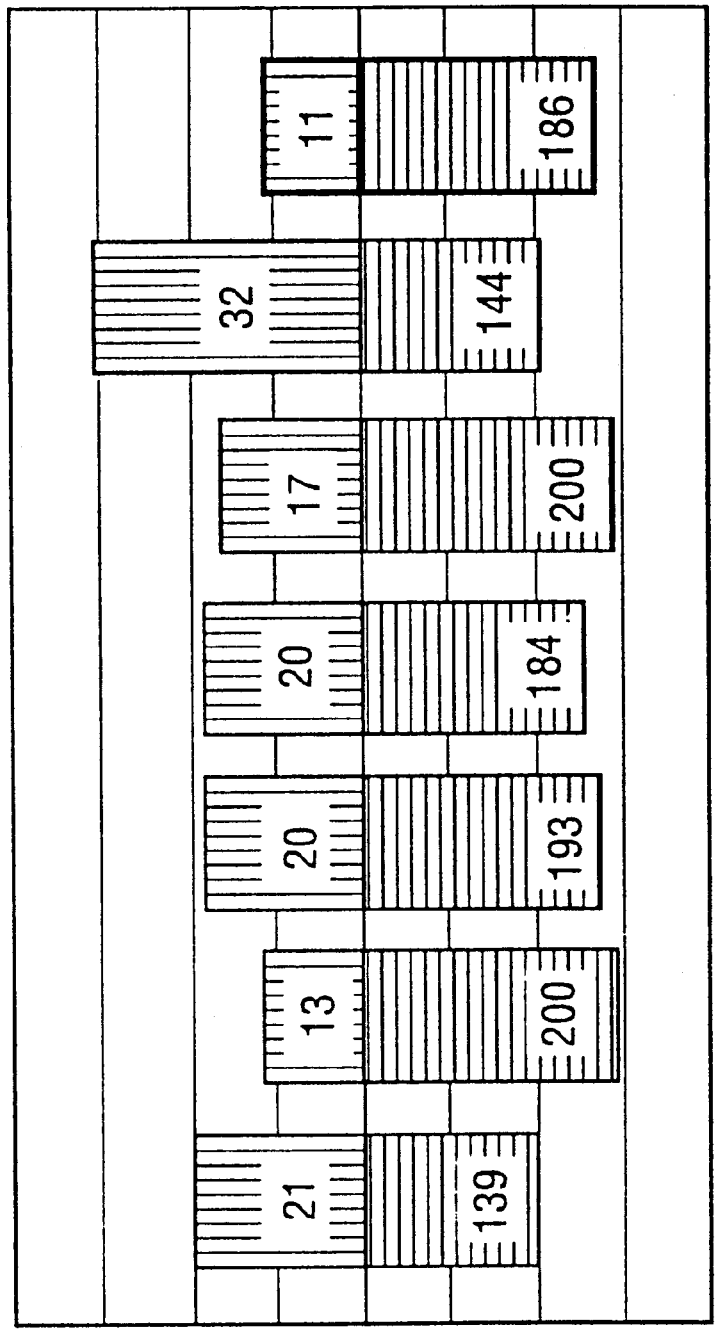

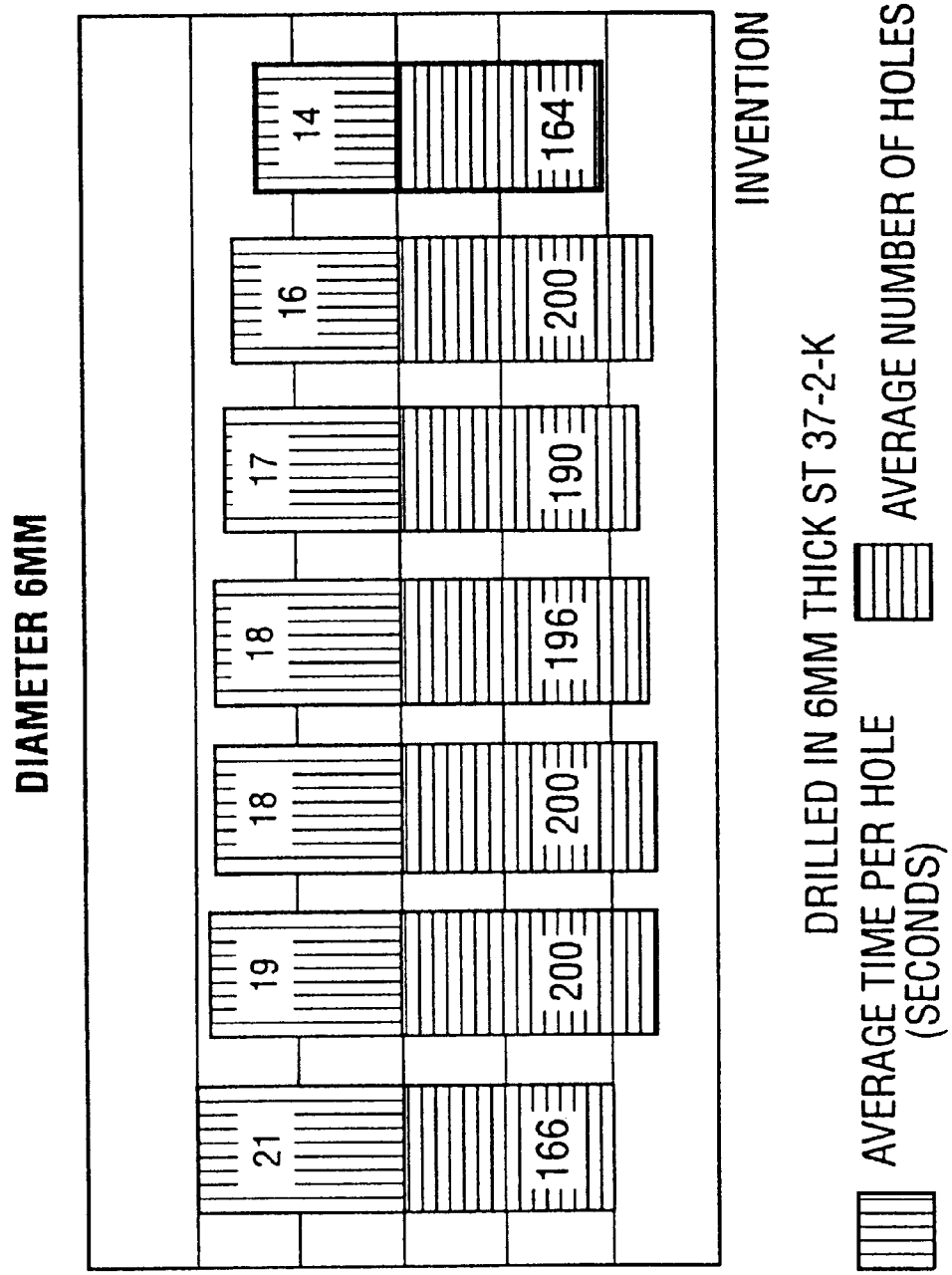

ROLL-FORGED DRILL BIT

This invention relates to roll-forged drill bits, and in particular to a roll-forged drill bit having a featured, or non-standard, tip.

Roll-forged drill bits are considered to be of lower quality than "cut-from-solid" drill bits. Accordingly, roll-forged drill bits tend to fill the lower end of the market and professional workmen always look to obtain cut-from-solid drill bits, where possible.

As will be appreciated, cut-from-solid drill bits result in significant wastage of material (up to about 30%) and are, therefore, expensive. However, the application of "featured" tips to drill bits has, to the present day, been seen only in this sector.

In general, roll-forged drill bits have a cutting tip or point defined by accepted standards which includes a central chisel edge and flats extending from the chisel edge to the outside of the drill bit tip. The included angle between the opposing flats is usually in the region of 118°.

In view of the foregoing, the present invention aims to improve upon the prior art roll-forged drill bits by producing a roll-forged drill bit including a featured cutting tip. Furthermore, a drill bit according to the present invention has improved performance over prior art roll-forged drill bits.

According to the present invention, there is provided a roll-forged drill bit comprising a shank for insertion in a chuck of a drill, the shank including an helically twisted web defining a cutting tip, the cutting tip including a central chisel edge and a cutting edge defining the maximum diameter of the cutting tip, wherein the cutting tip is formed after the shank has been roll-forged and includes a pair of faces defining the chisel edge and a pair of upturned flats defining the cutting edge. As a result, a drill bit according to the present invention is a marked improvement over prior art roll-forged drill bits and is likely, therefore, to attract much interest from potential customers and users.

Additionally, by including upturned flats defining the cutting edge, the axial distance between the chisel edge and the cutting edge tends to be shorter than in prior art roll-forged drill bits, thereby enabling thin workpieces to be cut more accurately because the chisel edge does not break through the workpiece before the cutting edge has engaged the workpiece.

In a preferred embodiment, the faces define an angle of between about 121° and about 127°, preferably approximately 124°. This angle results in the faces being flatter to the workpiece, during use, than is the case with prior art roll-forged drill bits. The complete length of the faces therefore engages a workpiece more quickly than is the case with prior art roll-forged drill bits, which results in quicker holes being produced by the drill bit.

Each flat preferably makes an angle of between about 3° and about 9°, more preferably approximately 6°, with a plane perpendicular to the axis of the shaft. By including the upturned flats, the cutting edges defined by the flats at the edge of the cutting tip help to produce a neat edge to the hole during drilling. The angle of inclination of the flats is, however, small, thereby insuring that the complete length of the flats comes into contact with a workpiece quickly. This arrangement, once again, assists in cutting holes quickly.

Preferably the web tapers from the shank towards the cutting tip to a greater extent than is usual, thereby creating a thinner web at the tip. This feature assists in reducing "walking" of the drill bit during use and increasing the ease with which the bit drills. Additionally, by including a tapered web, debris is removed from a work site more quickly and efficiently.

In a preferred embodiment, the web has a thickness at the cutting tip which is approximately 30% of its maximum thickness.

A specific embodiment of the present invention is now described, by way of example only, with reference to the accompanying drawings, in which:

FIG. 1 is a side view of a roll-forged drill bit according to the present invention;

FIG. 2 is a cross-sectional side view of the shank of a roll-forged drill bit showing diagrammatically the tapering of the web;

FIG. 3 is an enlarged view of the cutting tip of the roll-forged drill bit shown in FIG. 1;

FIG. 4 is a view of the cutting tip of FIG. 3 rotated through 90°;

FIG. 5 is a plan view of the cutting tip of FIGS. 3 and 4; and

FIGS. 6 to 8 are graphs comparing the life and speed of cut of 3 mm, 6 mm and 10 mm diameter respectively roll-forged drill bits according to the present invention with known prior art roll-forged drill bits.

Figure 8:
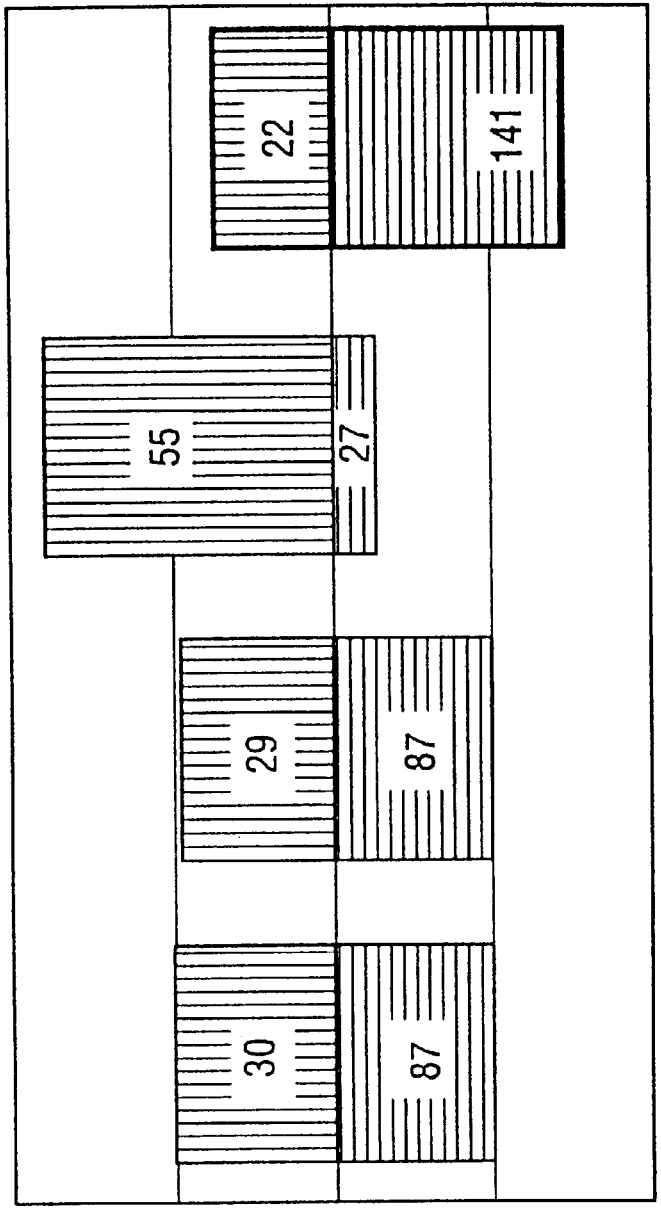

With reference to the drawings, a roll-forged drill bit 1 according to the present invention comprises a shank 3 including a solid end 5 for insertion in a chuck (not shown) of a drill, during use, and an helically twisted web 7 defining a cutting tip 9. As shown in FIG. 2, the web 7 tapers from the solid end 5 towards the cutting tip 9, so that the web 7 has a thickness at the cutting tip 9 which is less than 30% of its thickness where it joins the shank end 5. As a result, during use, "walking" of the drill bit is reduced and debris is removed from a work site in a quick and efficient manner.

With reference to FIGS. 3, 4 and 5 of the drawings, the cutting tip 9 comprises a chisel edge 11 defined by two faces 13 inclined rearwardly from the chisel edge 11. The faces 13 define an angle therebetween of approximately 124°, which is a slightly larger angle than in most prior art roll-forged drill bits.

Cutting edges 15 are defined by upturned flats 17, as shown in FIGS. 3–5 of the drawings. The cutting edges 15 make an angle of approximately 6° with a plane perpendicular to the axis of the shank 3. As a result, the outermost part of each cutting edge 15 produces a neat and clean cut in a workpiece, during use.

As can be seen in FIG. 3 of the drawings, the faces 13 defining the chisel edge 11 meet the flats 17 at a line 19, which defines a sudden change in the angle of the cutting tip 9. Once again, this is a substantial departure from the cutting tip arrangements known in prior art roll-forged drill bits.

By providing a roll-forged drill bit according to the present invention, a significant improvement in the performance of the drill bit 1 is produced. In this regard, as can be seen from FIGS. 6–8 of the drawings, drill bits 1 according to the present invention, described as "Invention" in the drawings, are shown compared against a number of other roll-forged drill bits currently in the market place. As can be seen, for drill bits having diameters of 3 mm (FIG. 6), 6 mm (FIG. 7) and 10 mm (FIG. 8), the drill bits according to the present invention are significantly quicker at drilling holes in workpieces without sacrificing a loss in life expectancy of the drill bit. Thus it will be appreciated that a roll-forged drill bit according to the present invention is a marked improvement over those known from the prior art.

It will of course be understood that the present invention has been described above purely by way of example, and that modifications of detail can be made within the scope of the invention.

We claim:

1. A drill bit comprising a shank for insertion in a chuck of a drill, the shank being roll-forged to include a helically twisted web defining a cutting tip, the cutting tip including a central chisel edge and a cutting edge defining the maximum diameter of the cutting tip, wherein the cutting tip is formed after the shank has been roll-forged and includes two faces defining the chisel edge and two surfaces defining the cutting edge, said two faces defining an obtuse angle and directly abutting said surfaces, said surfaces being upturned with respect to a plane transverse to the axis of the drill bit.

2. A drill bit comprising a shank for insertion in a chuck of a drill, the shank including a helically twisted web defining a cutting tip, the cutting tip including a central chisel edge and a cutting edge defining the maximum diameter of the cutting tip, two faces defining the chisel edge, the faces defining an angle of between 121° and 127° and two surfaces defining the cutting edge, said surfaces being upturned with respect to a plane transverse to the axis of the drill bit.

3. A roll-forged drill bit as claimed in claim 1, wherein the cutting edge defines an angle of between 3° and 9° with a plane perpendicular to the axis of the shank.

4. A drill bit comprising a shank for insertion in a chuck of a drill, the shank including a helically twisted web defining a cutting tip, the web tapering towards the cutting tip and having a thickness at the cutting tip which is no more than 30% of its maximum thickness, the cutting tip including a central chisel edge and a cutting edge defining the maximum diameter of the cutting tip, two faces defining the chisel edge, and two surfaces defining the cutting edge, said surfaces being upturned with respect to a plane transverse to the axis of the drill bit.

* * * * *